(12) United States Patent
Harada et al.

(10) Patent No.: US 9,121,522 B2
(45) Date of Patent: Sep. 1, 2015

(54) ELECTRICALLY OPERATED VALVE

(71) Applicant: FUJIKOKI CORPORATION, Tokyo (JP)

(72) Inventors: Takao Harada, Tokyo (JP); Masaya Satou, Tokyo (JP); Masaharu Itoh, Tokyo (JP); Bunta Narukawa, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 105 days.

(21) Appl. No.: 13/891,249

(22) Filed: May 10, 2013

(65) Prior Publication Data

US 2013/0306176 A1 Nov. 21, 2013

(30) Foreign Application Priority Data

May 18, 2012 (JP) .................................. 2012-114266

(51) Int. Cl.
*B60T 8/36* (2006.01)
*F16K 31/04* (2006.01)
*F16K 1/42* (2006.01)
*F16K 1/52* (2006.01)

(52) U.S. Cl.
CPC . *F16K 31/04* (2013.01); *F16K 1/42* (2013.01); *F16K 1/52* (2013.01); *Y10T 137/86485* (2015.04)

(58) Field of Classification Search
CPC ...... F16K 1/42; F16K 1/52; Y10T 137/86485
USPC ............... 137/599.14, 601.14, 301.18, 606.2, 137/614.16; 251/82; 62/324.6, 527, 222
See application file for complete search history.

(56) References Cited

U.S. PATENT DOCUMENTS

| | | | |
|---|---|---|---|
| 1,960,271 A * | 5/1934 | Lovekin | 137/73 |
| 4,372,486 A * | 2/1983 | Tomioka et al. | 236/92 B |
| 5,626,030 A * | 5/1997 | Nagai | 62/324.6 |
| 6,869,060 B2 * | 3/2005 | Barber et al. | 251/30.02 |
| 7,854,390 B2 * | 12/2010 | Hayashi | 236/92 B |
| 2009/0020716 A1 * | 1/2009 | Hokazono et al. | 251/129.11 |
| 2010/0263397 A1 * | 10/2010 | Suganuma | 62/324.6 |

FOREIGN PATENT DOCUMENTS

| | | |
|---|---|---|
| JP | 2001050415 A | 2/2001 |
| JP | 2009014056 A | 1/2009 |
| JP | 2009287913 A | 12/2009 |

* cited by examiner

*Primary Examiner* — Marina Tietjen
*Assistant Examiner* — Umashankar Venkatesan
(74) *Attorney, Agent, or Firm* — Bacon & Thomas, PLLC

(57) ABSTRACT

The invention provides an electrically operated valve which can control a flow rate precisely at a small flow rate distributing time and can circulate a fluid so as to prevent a pressure loss as much as possible at a large flow rate distributing time without an increase of a working and assembling cost. A movable valve seat body forming a main valve port for forming a small flow rate flow path extending from a first inlet and outlet to a second inlet and outlet is arranged between a valve chamber and a lower chamber. The movable valve seat body is structured such that its lower portion is slidably fitted and inserted to the lower chamber, and such as to serve as a float type check valve body for opening and blocking a large flow rate flow path extending from the second inlet and outlet to the first inlet and outlet.

2 Claims, 7 Drawing Sheets

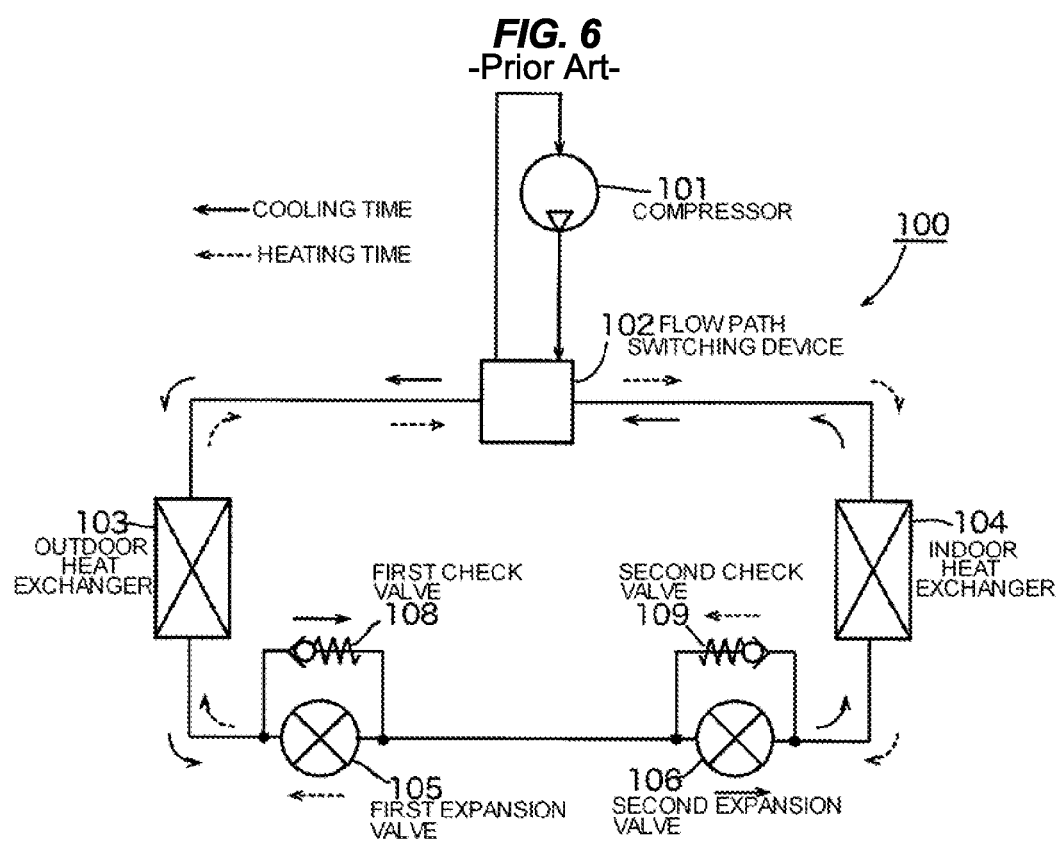

ELECTRICALLY OPERATED VALVE

BACKGROUND OF THE INVENTION

1. Field of the Invention

The present invention relates to an electrically operated valve which is used by being incorporated in a heat pump type cooling and heating system and the like, and more particularly to an electrically operated valve which can control a flow rate at a high precision at a forward flowing time (a small flow rate distributing time), and can reduce a pressure loss as much as possible at a reverse flowing time (a large flow rate distributing time).

2. Description of the Conventional Art

FIG. 6 shows an example of a heat pump type cooling and heating system. The cooling and heating system 100 is provided with a compressor 101, a flow path switching device 102, an outdoor heat exchanger (a condenser) 103, and an indoor heat exchanger (an evaporator) 104. The cooling and heating system 100 is further provided with two expansion valves (an illustration of distributors is omitted) for improving an energy saving efficiency, although one expansion valve is normally provided. In other words, a first expansion valve 105 is arranged near the outdoor heat exchanger 103, and a second expansion valve 106 is arranged near the indoor heat exchanger 104. A temperature sensing type (a mechanical type) structure is employed as the expansion valves 105 and 106. Further, in order to reduce a pressure loss as much as possible, first and second check valves 108 and 109 are arranged in parallel with the first and second expansion valves 105 and 106.

In the cooling and heating system 100, at a time of cooling, a refrigerant gas compressed by the compressor 101 is introduced to the outdoor heat exchanger 103 from the flow path switching device 102, for example, constructed by a four-way valve, as shown by a solid arrow in the drawing, and is heat exchanged here with an outside air so as to be condensed, and the condensed refrigerant flows into the second expansion valve 106 through the first check valve 108 (while bypassing the first expansion valve 105), is adiabatically expanded here, thereafter flows into the indoor heat exchanger 104, is heat exchanged with a room air by the indoor heat exchanger 104 so as to be evaporated, and cools the room.

On the contrary, at a time of heating, the refrigerant gas compressed by the compressor 101 is introduced into the indoor heat exchanger 104 from the flow path switching device 102 as shown by a broken arrow in the drawing, is heat exchanged here with the room air so as to be condensed, heats the room, thereafter passes through the second check valve 109 (while bypassing the second expansion valve 106), flows into the first expansion valve 105, is depressurized here, is thereafter introduced to the outdoor heat exchanger 103 via the distributor, is evaporated here, and is returned to the compressor 101.

As mentioned above, in the cooling and heating system 100, at a time of the forward flowing (at a time of cooling), the refrigerant is introduced to the second expansion valve 106 through the first check valve 108 without passing through the first expansion valve 105, and the flow rate is regulated by the second expansion valve 106, and at a time of the backward flowing (at a time of heating), the refrigerant is introduced to the first expansion valve 105 through the second check valve 109 without passing through the second expansion valve 106, and the flow rate is regulated by the first expansion valve 105. Accordingly, the pressure loss can be reduced as much as possible by incorporating the check valves 108 and 109 in parallel with the expansion valves 105 and 106.

In the meantime, in recent years, in the cooling and heating system 100 as mentioned above, there has been considered to employ an electronically controlled type electrically operated valve which can optionally control a lift amount, that is, an effective opening area of a valve port, in place of the temperature sensing type (the mechanical type) expansion valves 105 and 106, for further improving the energy saving efficiency.

A description will be given below of an example of the electronically controlled type electrically operated valve with reference to FIG. 7. An electrically operated valve 10' in an illustrated example is provided with a valve shaft 25 which has a lower large-diameter portion 25a and an upper small-diameter portion 25b, and is integrally provided with a valve body 24 in a lower end portion of the lower large-diameter portion 25a, a valve main body 15 which is provided with a valve seat 23A forming a valve port 23 which the valve body 24 comes into contact with and away from, and has a valve chamber 21 to which a first inlet and outlet 11 and a second inlet and outlet 12 constructed by a conduit (a joint) are connected, a can 40 which is hermetically joined its lower end portion to the valve main body 15 via an annular coupling device 44 by welding, a rotor 30 which is arranged in an inner periphery of the can 40 so as to be spaced at a predetermined distance α, a stator 50A which is outward fitted to the can 40 so as to rotationally drive the rotor 30, and a screw feed mechanism which is arranged between the rotor 30 and the valve body 24, and brings the valve body 24 into contact with and away from the valve port 23 by utilizing a rotation of the rotor 30, and is structured such as to control a passing flow rate of the refrigerant by changing a lift amount of the valve body 24 in relation to the valve port 23.

The stator 50A is constructed by a yoke 51, a bobbin 52, stator coils 53 and 53, and a resin mold cover 56, a stepping motor 50 is constructed by the rotor 30 and the stator 50A, and an elevation drive mechanism for regulating a lift amount of the valve body 24 in relation to the valve port 23 is constructed by the stepping motor 50 and the screw feed mechanism (mentioned later).

A support ring 36 is integrally coupled to the rotor 30, and an upper protruding portion of a tubular valve shaft holder 32 is fixed by caulking to the support ring 36, the valve shaft holder 32 being arranged in an outer periphery of the valve shaft 25 and a guide bush 26 and being open downward. Accordingly, the rotor 30, the support ring 36 and the valve shaft holder 32 are integrally coupled.

The screw feed mechanism is constructed by a fixed thread portion (a male thread portion) 28 which is formed in an outer periphery of the tubular guide bush 26, the tubular guide bush 26 being structured such that a lower end portion 26a is pressure fixed to the valve main body 15, and (the lower large-diameter portion 25a of) the valve shaft 25 is inward inserted to the guide bush 26 slidably, and a movable thread portion (a female thread portion) 38 which is formed in an inner periphery of the valve shaft holder 32 and is threadably engaged with the fixed thread portion 28.

Further, an upper small-diameter portion 26b of the guide bush 26 is inward inserted to an upper portion of the valve shaft holder 32, and the upper small-diameter portion 25b of the valve shaft 25 is inserted to (a through hole formed in) a center of a ceiling portion 32a of the valve shaft holder 32. A push nut 33 is pressure fixed to an upper end portion of the upper small-diameter portion 25b of the valve shaft 25.

Further, the valve shaft 25 is normally energized downward (in a valve closing direction) by a valve closing spring 34 constructed by a compression spring which is outward inserted to the upper small-diameter portion 25b of the valve shaft 25, and is provided in a compressed manner between the ceiling portion 32a of the valve shaft holder 32 and an upper end terrace surface of the lower large-diameter portion 25a in the valve shaft 25. A return spring 35 constructed by a coil spring is provided in an outer periphery of the push nut 33 on the ceiling portion 32a of the valve shaft holder 32.

A lower stopper body (a fixed stopper) 27 is firmly fixed to the guide bush 26, the lower stopper body 27 constructing one of a rotation downward movement stopper mechanism for inhibiting a further rotation and downward movement in the case that the rotor 30 is rotated and downward moved to a predetermined valve closing position, and an upper stopper body (a movable stopper) 37 is firmly fixed to the valve shaft holder 32, the upper stopper body 37 constructing the other of the stopper mechanism.

The valve closing spring 34 is provided for obtaining a desired sealing pressure (preventing leakage) in a valve closing state in which the valve body 24 seats on the valve port 23, and buffering a shock at a time when the valve body 24 comes into collision with the valve port 23.

In the electrically operated valve 10' structured as mentioned above, the rotor 30 and the valve shaft holder 32 are rotated in one direction in relation to the guide bush 26 which is fixed to the valve body 15, by feeding a conduction exciting pulse to the stator coils 53 and 53 according to a first mode, and the valve body 24 is pressed against the valve port 23 (the valve seat 23A), for example, on the basis of a downward movement of the valve shaft holder 32, by screw feeding the fixed screw portion 28 of the guide bush 26 and the movable thread portion 38 of the valve shaft holder 32, whereby the valve port 23 is closed (a full close state).

At a time point that the valve port 23 is closed, the upper stopper body 37 does not come into collision with the lower stopper body 27 yet, and the rotor 30 and the valve shaft holder 32 further rotate and move downward in a state in which the valve body 24 closes the valve port 23. In this case, since the valve shaft 25 (the valve body 24) does not move downward, however, the valve shaft holder 32 moves downward, the valve closing spring 34 is compressed at a predetermined amount. As a result, the valve body 24 is strongly pressed to the valve port 23, and the upper stopper body 37 comes into collision with the lower stopper body 27 on the basis of the rotation and the downward movement of the valve shaft holder 32. Accordingly, even if the pulse feed to the stator coils 53 and 53 is carried on thereafter, the rotation and the downward movement of the valve shaft holder 32 are forcibly stopped.

On the other hand, if the conduction exciting pulse is fed to the stator coils 53 and 53 according to a second mode, the rotor 30 and the valve shaft holder 32 are rotated in the inverse direction to the above in relation to the guide bush 26 which is fixed to the valve main body 15, and the valve shaft holder 32 moves upward at this time on the basis of the screw feed of the fixed thread portion 28 of the guide bush 26 and the movable thread portion 38 of the valve shaft holder 32. In this case, since the valve closing spring 34 is compressed at a predetermined amount as mentioned above at a time point that the valve shaft holder 32 starts rotating and moving upward (a time point that the pulse feed is started), the valve body 24 is not disconnected and keeps the valve closing state (lift amount=0), until the valve closing spring 34 elongates at the predetermined amount. Further, if the valve shaft holder 32 is further rotated and moved upward after the valve closing spring 34 elongates at the predetermined amount, the valve body 24 is disconnected from the valve port 23, the valve port 23 is opened, and the refrigerant passes through the valve port 23. In this case, it is possible to optionally and finely regulate the lift amount of the valve body 24, that is, the effective opening area of the valve port 23 on the basis of an amount of rotation of the rotor 30. Since the amount of rotation of the rotor 30 is controlled by a feed pulse number, it is possible to precisely control the flow rate of the refrigerant (refer the details to Japanese Unexamined Patent Publications No. 2001-50415 and No. 2009-14056).

Even in the case that the electrically operated valve 10' as mentioned above is employed in the cooling and heating system 100, there is the following problem to be improved. In other words, in the cooling and heating system 100, since the refrigerant is conducted to the second expansion valve 106 through the first check valve 108 without passing through the first expansion valve 105 and the flow rate is regulated by the second expansion valve 106, at the forward flowing time (the cooling time), and the refrigerant is conducted to the first expansion valve 105 through the second check valve 109 without passing through the second expansion valve 106, and the flow rate is regulated by the first expansion valve 105, at the inversely flowing time (the heating time), it is indispensable to incorporate the check valves 108 and 109 in parallel with the expansion valves 105 and 106. However, in the case that two check valves are incorporated in the refrigerant circuit, the number of the parts such as the joints is increased at that degree, and it takes a lot of labor and long time unnecessarily to carry out a piping connecting work. Accordingly, in Japanese Unexamined Patent Publication No. 2009-14056, there has been proposed an electrically operated valve having both the functions of the expansion valve and the check valve, that is, the electrically operated valve structured such that a lift amount (an effective opening area) is finely controlled in a specific range which is equal to or less than a predetermined value, for carrying out a flow rate control, at a time when the refrigerant is flowed in one direction (a forward flowing time=a small flow rate distributing time), and the lift amount (the effective opening area) is set to the maximum for reducing the pressure loss as much as possible, at a time when the refrigerant is flowed in the other direction (an inversely flowing time=a large flow rate distributing time).

However, in the electrically operated valve proposed above, in the case that a bore diameter of a valve port is enlarged for reducing the pressure loss at the large flow rate distributing time, there is a problem that it is impossible to carry out the flow rate control at a high precision at the small flow rate distributing time.

On the other hand, in order to achieve both the reduction of the pressure loss at the large flow rate distributing time and the improvement of the flow rate control precision at the small flow rate distributing time, there has been proposed a bidirectional distribution type electrically operated valve having a valve main body which is provided with a first inlet and outlet, a valve chamber, a lower chamber and a second inlet and outlet, a movable valve seat body which is arranged within the valve chamber, forms a main valve port for forming a small flow rate flow path extending from the first inlet and outlet to the second inlet and outlet, and serving also as a float type check valve body for opening and blocking a large flow rate flow path extending from the second inlet and outlet to the first inlet and outlet, a valve shaft which has a needle type valve body portion arranged within the valve chamber for regulating a flow rate passing through the main valve port, and a motor for moving up and down the valve shaft, and structured such as to close the large flow rate flow path by the movable valve seat body so as to circulate a fluid only a portion between the valve body portion and the main valve port for precisely carrying out a flow rate control at a small flow rate distributing time, and open the large flow rate flow path by making the movable valve seat body (the check valve body) float for reducing the pressure loss as much as possible at a large flow rate distributing time, as described in Japanese Unexamined Patent Publication No. 2009-287913.

SUMMARY OF THE INVENTION

Problem to be Solved by the Invention

However, in the electrically operated valve described in Japanese Unexamined Patent Publication No. 2009-287913 mentioned above, since the electrically operated valve is structured such that the flow rate control is carried out only by the needle type valve body portion at the small flow rate distributing time, and the movable valve seat body (the check valve body) automatically opens the large flow rate flow path at the large flow rate distributing time, it is possible to achieve both the improvement of the flow rate control precision at the small flow rate distributing time and the reduction of the pressure loss at the large flow rate distributing time, however, since the movable valve seat body (the check valve body) is arranged in the valve chamber in which the valve shaft is arranged, and the movable valve seat body moves up and down along an inner peripheral wall surface serving as a slide guide surface, the movable valve seat body tends to be larger, and a comparatively larger space is necessary in the valve chamber for moving up and down the movable valve seat body. As a result, the valve main body tends to be enlarged in size, an internal structure tends to be complicated, and a working and assembling cost tends to be increased. Accordingly, a cost effectiveness comes to a problem.

Further, in the electrically operated valve, it is necessary to form a communication hole having such a magnitude that does not affect a flow rate characteristic by a needle at the small flow rate distributing time in a side surface of the movable valve seat body.

The present invention is made by taking the actual condition mentioned above into consideration, and an object of the present invention is to provide an electrically operated valve which can control a flow rate precisely at a small flow rate distributing time and can circulate a fluid so as to prevent a pressure loss as much as possible at a large flow rate distributing time, without causing an enlargement in size of a valve main body, a complication of an internal structure and an increase of a working and assembling cost, and is excellent in a cost effectiveness. Further, the other object of the present invention is to provide an electrically operated valve which is simple in a structure, can quickly and stably change a distributing direction, and can improve a reliability on the basis of a stable operation state.

Means for Solving the Problem

In order to achieve the object mentioned above, an electrically operated valve according to the present invention is basically provided with a valve main body having a first inlet and outlet, a valve chamber to which the first inlet and outlet is open, a lower chamber which is connected to the valve chamber, and a second inlet and outlet which is connected to the lower chamber, a movable valve seat body which is arranged between the valve chamber and the lower chamber, and forms a main valve port for forming a small flow rate flow path extending from the first inlet and outlet to the second inlet and outlet, a valve shaft which has a needle type valve body portion arranged within the valve chamber for regulating a flow rate passing through the main valve port, and a motor for moving up and down the valve shaft, and the movable valve seat body is structured such that its lower portion is slidably fitted and inserted to the lower chamber, and is structured such as to serve as a float type check valve body for opening and blocking a large flow rate flow path extending from the second inlet and outlet to the first inlet and outlet.

The movable valve seat body preferably has a valve seat plate portion having an outer peripheral portion which is connected to and disconnected from an opening end edge portion close to the valve chamber in the lower chamber, for opening and blocking the large flow rate flow path, and a fitting portion which comes down from the valve seat plate portion so as to be slidably fitted to the lower chamber, the main valve port is formed in the valve seat plate portion, and a communication path such as a through hole, a notch or a groove for forming the large flow rate flow path is formed in the fitting portion.

The large flow rate flow path is preferably constructed by the lower chamber, the communication path such as the through hole, the notch or the groove formed in the fitting portion of the movable valve seat body, and the valve chamber.

Effect of the Invention

In the electrically operated valve according to the present invention, the movable valve seat body serving also as the float type check valve body is slidably fitted to the lower chamber in its most part (the fitting portion) at a time of closing the large flow rate flow path, and floats up to the valve chamber side at a time of opening the large flow rate flow path. Accordingly, in comparison with the conventional case that a whole of the movable valve seat body is arranged in the valve chamber 21, it is possible to simplify the structure, and it is possible to make the movable valve seat body small without reducing the maximum distributing amount. Further, a large space for moving up and down the movable valve seat body is not necessary in the valve chamber.

Accordingly, it is possible to effectively achieve a downsizing of the valve main body, and a reduction of the parts cost and the working and assembling cost.

BRIEF EXPLANATION OF THE DRAWINGS

FIGS. 4A to 4D show an example of a movable valve seat body which is used in the electrically operated valve shown in FIGS. 1 to 3, in which FIG. 4A is a perspective view, FIG. 4B is a plan view, FIG. 4C is a side elevational view, and FIG. 4D is a bottom elevational view;

FIGS. 5A to 5D show the other example of the movable valve seat body which is used in the electrically operated valve shown in FIGS. 1 to 3, in which FIG. 5A is a perspective view, FIG. 5B is a plan view, FIG. 5C is a side elevational view, and FIG. 5D is a bottom elevational view;

FIG. 6 is a schematic view showing an example of a conventional heat pump type cooling and heating system.

DETAILED DESCRIPTION OF PREFERRED EMBODIMENT

A description will be given below of an embodiment of an electrically operated valve according to the present invention with reference to the accompanying drawings.

Figure 1:
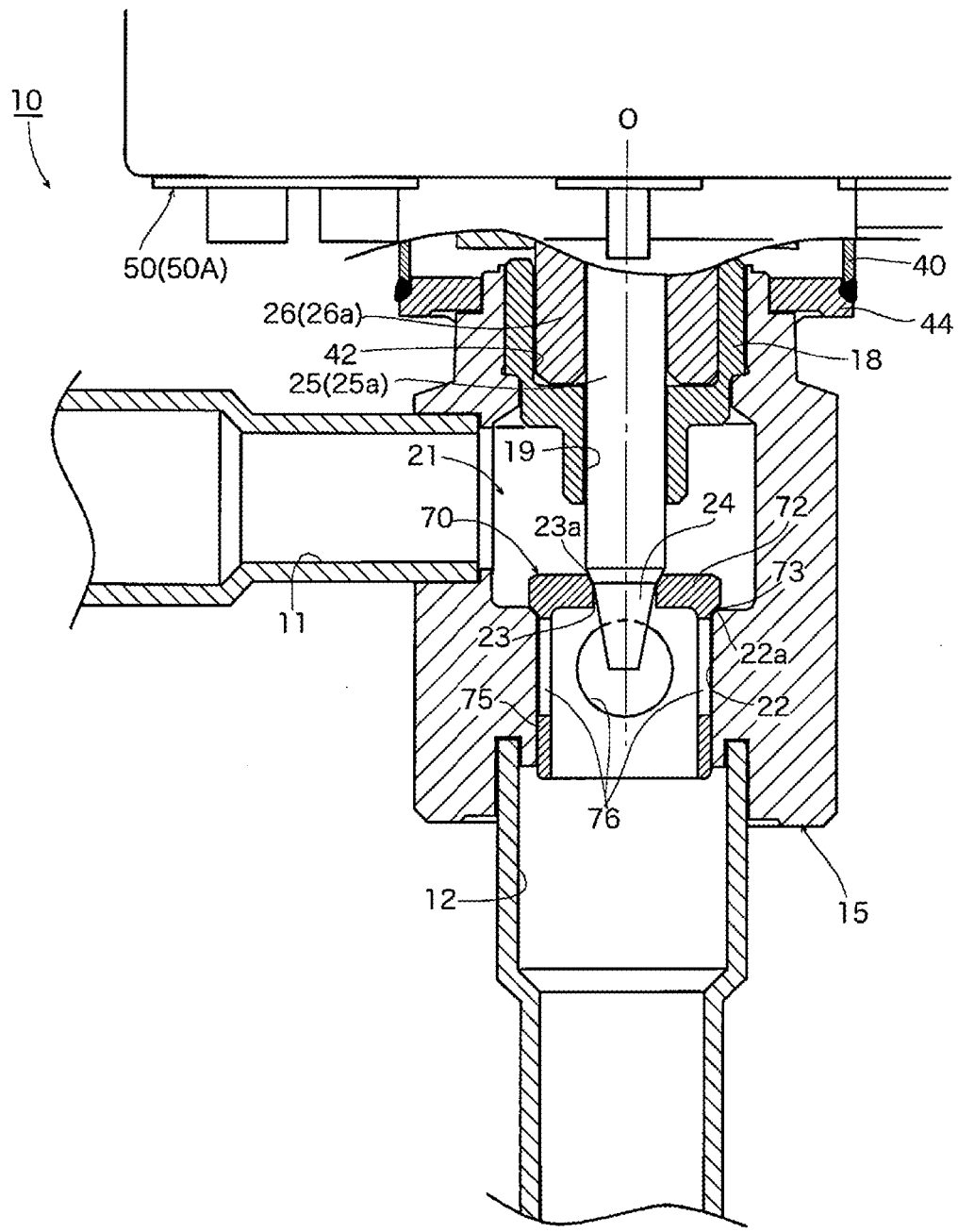
FIG. 1 is a partly cut cross sectional view showing a state of a non-distributing time (a full close time) of a substantial part in an embodiment of an electrically operated valve according to the present invention.
Figure 2:
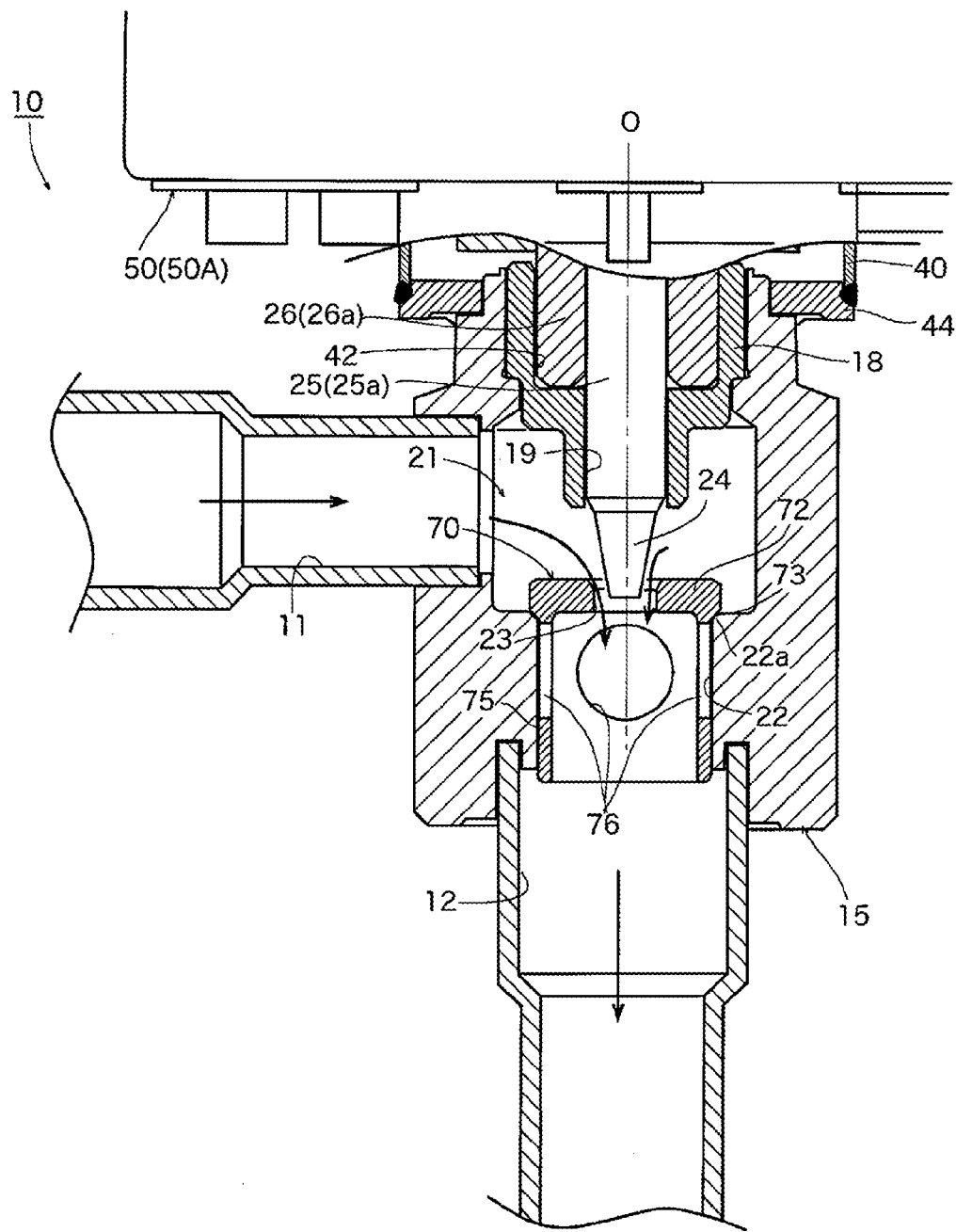
FIG. 2 is a partly cut cross sectional view showing a state of a forward flowing time (a small flow rate distributing time) of the substantial part in the embodiment of the electrically operated valve according to the present invention.
Figure 3:
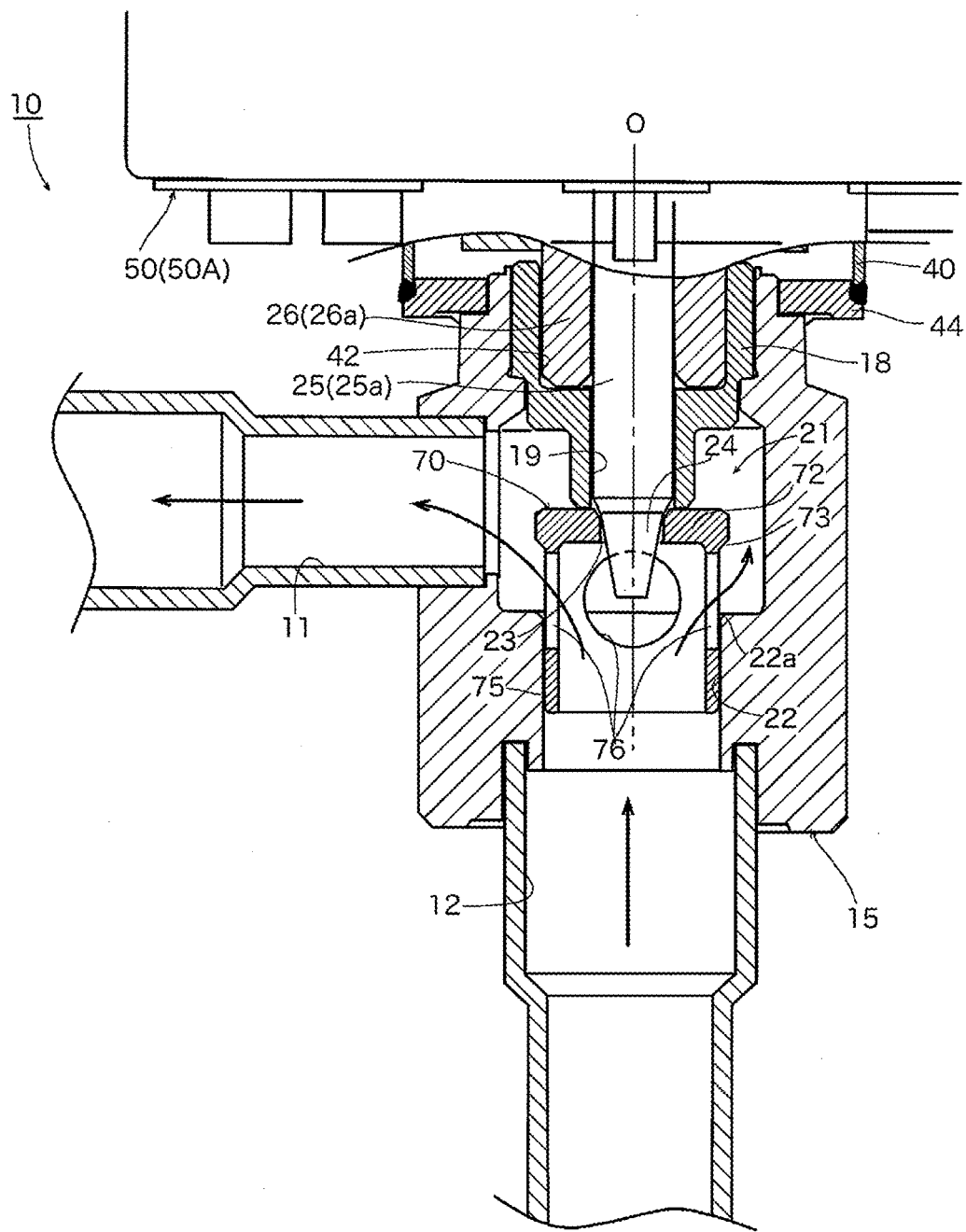
FIG. 3 is a partly cut cross sectional view showing a state of an inversely flowing time (a large flow rate distributing time) of the substantial part in the embodiment of the electrically operated valve according to the present invention.
Figure 4A:
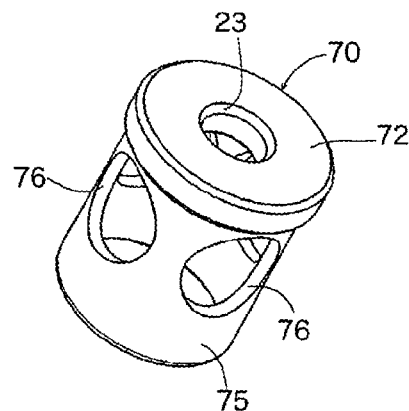
Figure 4B:
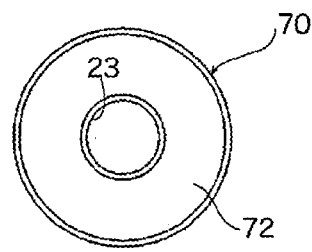
Figure 4C:
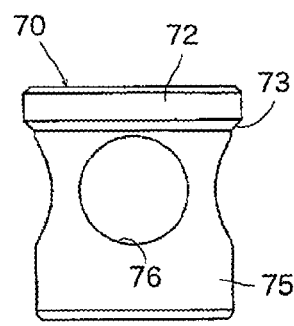
Figure 4D:
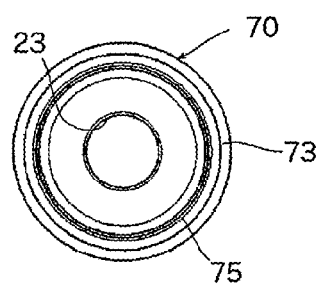
Figure 5A:
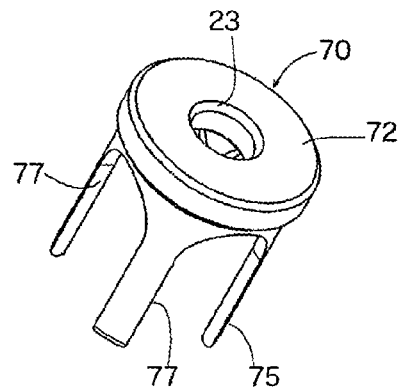
Figure 5B:
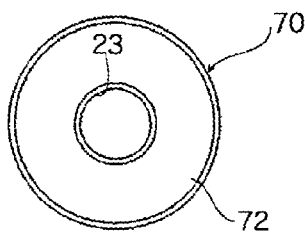
Figure 5C:
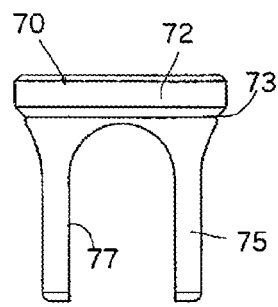
Figure 5D:
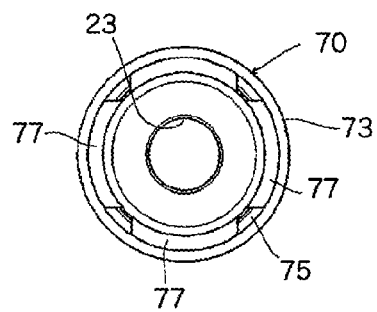

FIGS. 1, 2 and 3 are partly cut cross sectional views of a substantial part in an embodiment of an electrically operated valve according to the present invention, in which FIG. 1 shows a non-distributing time (a full close time), FIG. 2 shows a forward flowing time (a small flow rate distributing time), and FIG. 3 shows an inversely flowing time (a large flow rate distributing time). In the present embodiment, a case that a flowing direction of a fluid (a refrigerant) is from a first inlet and outlet 11 to a second inlet and outlet 12 (first inlet and outlet 11→second inlet and outlet 12) is called as a forward flow (FIG. 2), and a case that the flowing direction of the fluid (the refrigerant) is from the second inlet and outlet 12 to the first inlet and outlet 11 (second inlet and outlet 12→first inlet and outlet 11) is called as an inverse flow (FIG. 3).

Figure 7:
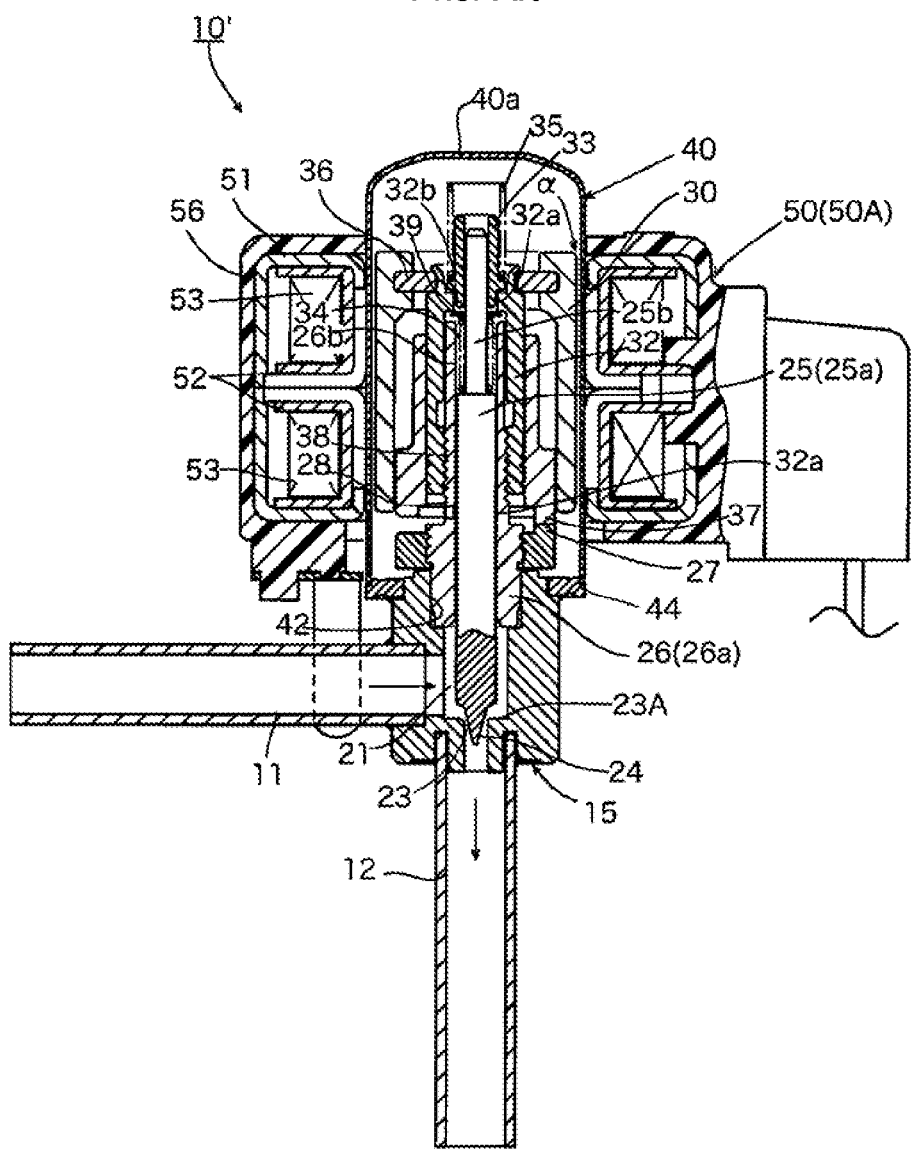
FIG. 7 is a vertical cross sectional view showing an example of the conventional electrically operated valve.

Further, since basic structures of a stepping motor 50 and a valve shaft 25 in an electrically operated valve 10 of an illustrated embodiment are approximately the same as the electrically operated valve 10' of the conventional example shown in FIG. 7, the same reference numerals are attached to the corresponding portions to the respective portions of the electrically operated valve 10' in the conventional example shown in FIG. 7, an overlapping description thereof will be omitted, and a principal part (a characteristic part) will be mainly described below.

A valve main body 15 according to the present embodiment is provided with a first inlet and outlet 11, a valve chamber 21 to which the first inlet and outlet is open, a cylindrical lower chamber 22 which is connected to the valve chamber 21, and a second inlet and outlet 12 which is connected to the lower chamber 22, sequentially as seen from a forward flowing direction.

In more detail, a lid-like member 18 is attached and fitted to an upper portion of the valve main body 15 so as to be bonded by welding. The lid-like member 18 has an upper surface opening hole 42 to which a lower large-diameter portion 26a of a guide bush 26 is press fitted and fixed. A lower portion of the lid-like member is provided with a guide hole 19 to which a valve shaft 25 is slidably fitted.

A movable valve seat body 70 is arranged between the valve chamber 21 and the lower chamber 22. A main valve port 23 is formed in the movable valve seat body 70 which is provided for forming a small flow rate flow path extending from the first inlet and outlet 11 to the second inlet and outlet 12.

Further, the movable valve seat body 70 is slidably fitted its lower portion to the lower chamber 22, and is structured such as to serve also as a float type check valve body for opening and blocking a large flow rate flow path extending from the second inlet and outlet 12 to the first inlet and outlet 11.

In more detail, the movable valve seat 70 is constructed by a valve seat plate portion 72 and a cylindrical fitting portion 75 connected to the valve seat plate portion 72, as is well known by referring to FIG. 4 in addition to FIGS. 1 to 3. The valve seat plate portion 72 is structured such that a check valve body portion 73 constructed by an inverted cone surface portion formed in a lower surface side of an outer peripheral portion comes into contact with and away from an opening end edge portion 22a (which corresponds to a valve seat of a check valve port) in the valve chamber 21 side in the lower chamber 22, for opening and blocking the large flow rate flow path. The fitting portion 75 comes down from the vicinity of a lower end of the check valve body portion 73 in the valve seat plate portion 72 so as to be slidably fitted to the lower chamber 22.

A main valve port 23 opened and closed by a needle type valve body portion 24 provided in a lower end portion of the valve rod 25 is formed in the center of the valve seat plate portion 72 of the movable valve seat body 70, and four circular through holes 76 are formed in an upper portion of the fitting portion 75 in the movable valve seat body 70 at uniform angular intervals (90 degrees) for forming the large flow rate flow path.

Here, in the present embodiment, the large flow rate flow path is constructed by the lower chamber 22, four through holes 76 formed in the fitting portion 75 of the movable valve seat body 70, and the valve chamber 21.

In the electrically operated valve 10 according to the present embodiment which is structured as mentioned above, since a pressure in the valve chamber 21 is larger than a pressure in the lower chamber 22 at the small flow rate distributing time (the forward flowing time) as shown in FIG. 2, the check valve body portion 73 of the movable valve seat body 70 is pressed to the opening end edge portion 22a (the check valve port) close to the valve chamber 21 in the lower chamber 22, whereby the large flow rate flow path is closed, and the refrigerant (the fluid) introduced to the valve chamber 21 from the first inlet and outlet 11 flows out to the lower chamber 22→the second inlet and outlet 12 via a gap which is formed between the main valve portion 23 and the valve body portion 24.

On the other hand, at the large flow rate distributing time (the inversely flowing time) as shown in FIG. 3, the valve shaft 25 is moved up, for example, to a maximum lift position. In this case, since the pressure in the valve chamber 21 is smaller than the pressure in the lower chamber 22, the valve shaft 25 is pushed up until the movable valve seat body 70 comes into contact with the lower end of the lid-like member 18 by the pressure of the fluid (the refrigerant). Accordingly, the check valve body portion 73 of the movable valve seat body 70 moves away from the opening end edge portion 22a (the check valve port) close to the valve chamber 21 in the lower chamber 22, and four through holes 76 move into the valve chamber 21 so as to be opened, whereby the refrigerant (the fluid) from the second inlet and outlet 12 flows to the first inlet and outlet 11 through the lower chamber 22 constructing the large flow rate flow path→four through holes 76 formed in the fitting portion 75 of the movable valve seat body 70→the valve chamber 21.

As mentioned above, the electrically operated valve 10 according to the present embodiment can precisely control the flow rate at the small flow rate distributing time, can circulate the fluid so as to prevent the pressure loss from being generated as much as possible at the large flow rate distributing time, can quickly and stably change the distributing direction, and can improve a reliability on the basis of a stable operating state.

In addition to the above, the movable valve seat body 70 serving also as the float type check valve body is slidably fitted to the lower chamber 22 in its most part (the fitting portion 75) at a time of closing the large flow rate flow path, and floats up to the valve chamber 21 side at a time of opening the large flow rate flow path. Accordingly, in comparison with the conventional case that a whole of the movable valve seat body is arranged in the valve chamber 21, it is possible to simplify the structure, and it is possible to make the movable valve seat body small without reducing the maximum distributing amount. Further, a large space for moving up and down the movable valve seat body is not necessary in the valve chamber.

Accordingly, it is possible to effectively achieve a downsizing of the valve main body, and a reduction of the parts cost and the working and assembling cost.

The movable valve seat body 70 can be manufactured by a metal such as a stainless steel or a brass, in a material. Further, the movable valve seat body 70 can be manufactured with comparatively light weight by using one or some of a plastic, a light metal such as an aluminum, a ceramic, and a rubber (for example, by forming the movable valve seat body by a hard plastic and coating its surface with a rubber having an elasticity).

The embodiment according to the present invention is mentioned in detail above, however, the present invention is not limited to the embodiment mentioned above, but can be variously design changed within a range which does not deflect from the scope of the present invention described in claims.

For example, in the embodiment mentioned above, four circular through holes 76 are formed at the uniform angular intervals (90 degrees) for forming the large flow rate flow path in the upper portion in the fitting portion 75 of the movable valve seat body 70, however, half race track shaped notches 77 which are open in their lower side may be formed in the fitting portion 75, in place of the through holes 76. The number and the shape of the through holes 76 and the notches 77 can be appropriately changed. Further, vertical grooves may be formed in place of the through holes 76 and the notches 77. In other words, as long as the fitting portion 75 is provided with a communication path communicating the lower chamber 22 and the valve chamber 21 at a time when the movable valve seat body 70 moves up, the shape of the communication path is not limited to the through holes 76, the notches 77 and the vertical grooves, and any number of the communication path may be provided.

Further, it goes without saying that the electrically operated valve according to the present invention can be applied not only to the heat pump type cooling and heating system, but also to the other systems.

What is claimed is:

1. An electrically operated valve comprising:
   a valve main body having a first inlet and outlet, a valve chamber to which said first inlet and outlet is open, a lower chamber which is connected to said valve chamber, and a second inlet and outlet which is connected to said lower chamber;
   a movable valve seat body which is arranged between said valve chamber and said lower chamber, and forms a main valve port for forming a small flow rate flow path extending from said first inlet and outlet to the second inlet and outlet;
   a valve shaft which has a needle type valve body portion arranged within said valve chamber for regulating a flow rate passing through said main valve port; and
   a motor for moving up and down said valve shaft,
   wherein said movable valve seat body has a valve seat plate portion having an outer peripheral portion which is connected to and disconnected from an opening end edge portion close to said valve chamber in said lower chamber,
   a fitting portion which comes down from said valve seat plate portion so as to be slidably fitted to said lower chamber,
   said main valve port is formed in said valve seat plate portion, and
   a communication path providing a large flow rate flow path is formed in said fitting portion extending from the second inlet and outlet to the first inlet and outlet,
   wherein said movable valve seat body is configured to serve as a float type check valve body for opening and blocking said large flow rate flow path, and
   wherein said movable valve seat body is configured so as to be pressed to said opening end edge portion when the liquid flows from said first inlet and outlet to the second inlet and outlet, and configured so as to be moved away from said opening end edge portion by an upward movement of the valve shaft by the motor, permitting the communication path moved into the valve chamber so as to be opened, when the liquid flows from said second inlet and outlet to the first inlet and outlet.

2. The electrically operated valve according to claim 1, wherein said large flow rate flow path is constructed by said lower chamber, said communication path such as the through hole, the notch or the groove formed in the fitting portion of said movable valve seat body, and said valve chamber.

\* \* \* \* \*